(12) United States Patent
Yada

(10) Patent No.: US 7,193,732 B2
(45) Date of Patent: Mar. 20, 2007

(54) COMMAND INTERPRETATION USING REWRITABLE COMMAND REGISTERS

(75) Inventor: Junya Yada, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 930 days.

(21) Appl. No.: 09/849,304

(22) Filed: May 7, 2001

(65) Prior Publication Data

US 2002/0005960 A1    Jan. 17, 2002

(30) Foreign Application Priority Data

May 12, 2000    (JP)    ............... 2000-140304

(51) Int. Cl.
*G06F 15/00* (2006.01)
*G06K 1/00* (2006.01)
*B41J 1/00* (2006.01)

(52) U.S. Cl. .............. 358/1.1; 358/1.15; 358/1.14

(58) Field of Classification Search ............. 358/1.1, 358/1.9, 1.16, 1.15; 400/62, 70
See application file for complete search history.

(56) References Cited

U.S. PATENT DOCUMENTS 5,742,742 A    4/1998    Ueda ................. 358/1.9
5,899,614 A *  5/1999   Maeda et al. ........... 400/62

FOREIGN PATENT DOCUMENTS

| EP | 0 945 780 | | 9/1999 |
| EP | 0 945 780 A | * | 9/1999 |
| JP | 11-338651 | | 12/1999 |

* cited by examiner

*Primary Examiner*—Kimberly Williams
*Assistant Examiner*—Scott A. Schlack
(74) *Attorney, Agent, or Firm*—Oblon, Spivak, McClelland, Maier & Neustadt, P.C.

(57) ABSTRACT

An object of the present invention is to provide a command data conversion device and printing apparatus that can correctly interpret print command data even where the codes or the parameter codes assigned to the commands in the print command data change, or where the data output sequence changes. Using the present invention, print command data including commands used in print control as well as associated data are received, and the contents thereof are interpreted. Multiple commands are rewritably stored in command registers in advance, and if a command included in the print command data matches any of the stored multiple commands, prescribed processing is carried out to at least one of either the command or its associated data.

3 Claims, 15 Drawing Sheets

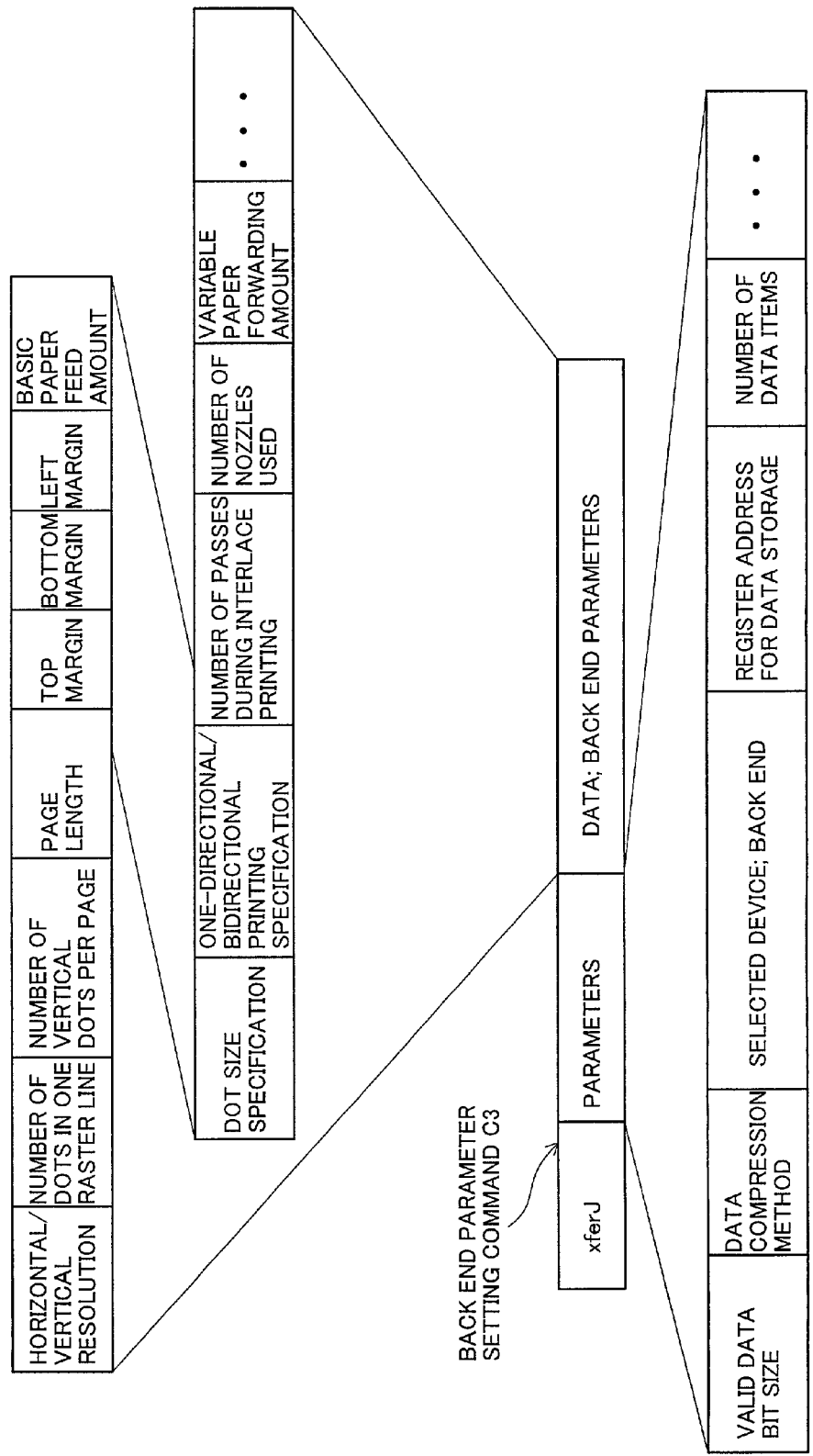

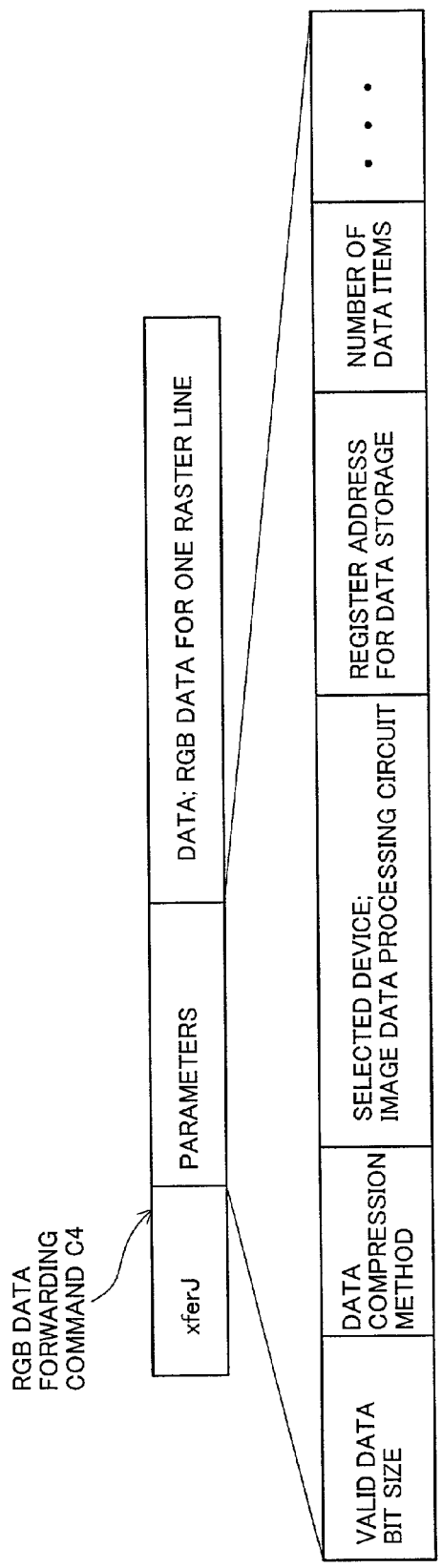
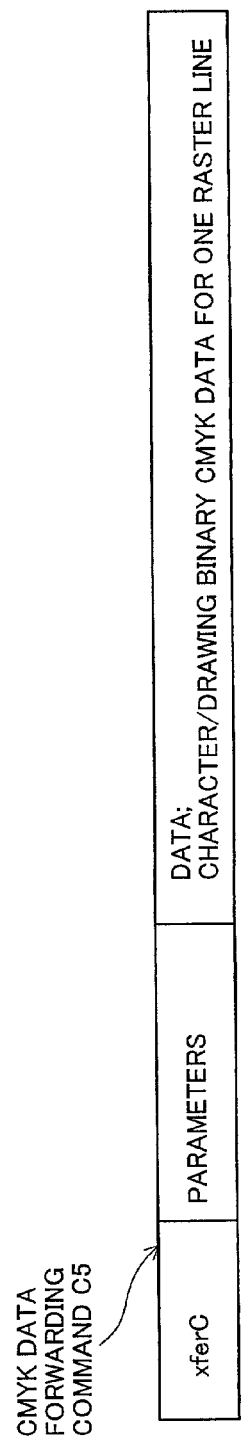
Fig. 5(A)
Fig. 5(B)

RASTER END COMMAND C6

PAGE END COMMAND C7

RGB RASTER GRAPHIC
MODE END COMMAND C8

INITIAL STATE

AFTER REWRITING

COMMAND INTERPRETATION USING REWRITABLE COMMAND REGISTERS

BACKGROUND OF THE INVENTION

1. Field of the Invention

The present invention relates to a technology to perform printing in accordance with print command data, and more particularly, to a technology that can cope with changes in commands or in the order of data.

2. Description of the Related Art

Printers used in a computer system perform printing in accordance with print command data input from a host computer. When the printer cannot use the input print command data as is, the print command data is interpreted and converted by the printer, and printing is executed in accordance with the post-conversion print commands. In certain types of printers, the command data interpretation and conversion are carried out by ASIC (Application-Specific Integrated Circuit) devices. One example of a printer control circuit used in this type of printer is disclosed in JP11-338651A.

However, in the conventional printer control circuit, because the information used to interpret the print command data is fixed, when the codes or parameter codes assigned to commands are changed, or when the order of data input is changed, the print command data cannot be correctly interpreted.

SUMMARY OF THE INVENTION

Accordingly, an object of the present invention is to provide a command data conversion device and printing apparatus that can appropriately interpret the print command data even if the codes or parameter codes assigned to commands are changed or if the order of data input is changed.

In order to resolve at least part of the above and other object of the present invention, there is provided a command data conversion device for use in a printing system. This command data conversion device receives print command data including commands to be used in print control and associated data and interprets contents of the print command data. Multiple commands are stored beforehand in command registers, and when a command included in the print command data matches any of the multiple commands stored in the command registers, prescribed processing is executed with regard to at least one of either the command or the associated data. The multiple commands may be written into the command registers at least when the command data conversion device is manufactured. Using this construction, the commands to be processed are stored in the command registers when the command data conversion device is manufactured.

It is preferred that the command registers are rewritable memories. Using this construction, the commands stored beforehand may be rewritten where necessary so that they may be used for command interpretation. Therefore, even where commands codes have changed, the commands to be processed are correctly interpreted and specified, and processing carried out accordingly, through the rewriting of the stored commands.

Furthermore, it is preferred that prior to the interpretation of the print command data, when the commands to be stored in the command registers are supplied by an external device, the command interpreter stores in the command registers the commands to be stored. Using this construction, the commands to be processed by the processor may be changed through the changing of the commands supplied by the external device to the command registers, without replacing the command data register itself.

Moreover, by using an ASIC (Application-Specific Integrated Circuit) chip as the command data conversion device, the apparatus may be produced at low cost and in large quantities.

It is also preferred that when first command data including a first data forwarding command and first image data expressed in terms of a first color system is supplied as the print command data, a process is executed that convert the input first image data into second image data expressed in terms of a second color system. If this is done, the first image data is correctly selected and converted into the second image data even if the first data forwarding command has changed.

The second image data may be expressed in terms of a color system using ink colors used in the printing system. In this way, the post-conversion image data may be used in the printing apparatus.

In addition, hen second command data comprising a second data forwarding command and the second image data expressed in terms of the second color system is supplied as the print command data, it is preferred that third image data expressed in terms of the second color system be generated through conversion of the first image data, and that the second image data and the third image data then be synthesized.

If this is done, the first image data only is converted and both the first and the second image data are made into a single block of image data even where the first and second image data are combined in the print command data.

In another aspect of the present invention, when multiple image data sets corresponding to multiple inks used in the printing system are received, a number of the image data sets received is counted. Multiple ink color data indexes indicating which of multiple inks is to be used are stored in prescribed registers. Data is generated by adding to each of the image data sets a corresponding one of the ink color data indexes stored in the registers in accordance with a value of the counter when each of the image data sets is received. Ink color data registers that store in prescribed registers multiple ink color data indexes indicating which of multiple inks is to be used is made so that the multiple ink color data indexes may be written at least when the command data conversion device is manufactured. Using this construction, the relationship between each ink color and counter value is determined and ink color data are stored in the appropriate memory areas in the ink color data registers when the command data conversion device is manufactured.

It is preferred that the ink color data registers are rewritable memories. Using this construction, the ink color data stored so that it may be added to each image data set may be rewritten as necessary. Therefore, even if the order in which image data sets are received changes, the correct ink color data may be added to each image data set.

The present invention may be realized in the various forms listed below.

(1) Command data conversion apparatus, printing apparatus, or printer control apparatus.
(2) Command data conversion method, printing method, or printer control method.
(3) Computer program to realize the above apparatuses or methods.
(4) Recording medium to record the computer program to realize the above apparatuses or methods.

(5) Data signals encoded in carrier waves that include a computer program to realize the above apparatuses or methods.

These and other objects, features, aspects, and advantages of the present invention will become more apparent from the following detailed description of the preferred embodiments with the accompanying drawings.

BRIEF DESCRIPTION OF THE DRAWINGS

FIG. 4 shows the contents of the back end parameter setting command C3;

FIGS. 5(A) and 5(B) show the contents of the RGB data forwarding command C4 and the CMYK data forwarding command C5;

DESCRIPTION OF THE PREFERRED EMBODIMENTS

Embodiments of the present invention will be described in the following order:

A. Construction and operation of command data conversion circuit in printer

B. Interpreting of control circuit commands in print command data

C. Image processing, raster data overlapping

D. Printer command generation

E. Allocation of commands

F. Variation 1

G. Variation 2

A. Construction and Operation of Command Data Conversion Circuit in Printer

Figure 1:
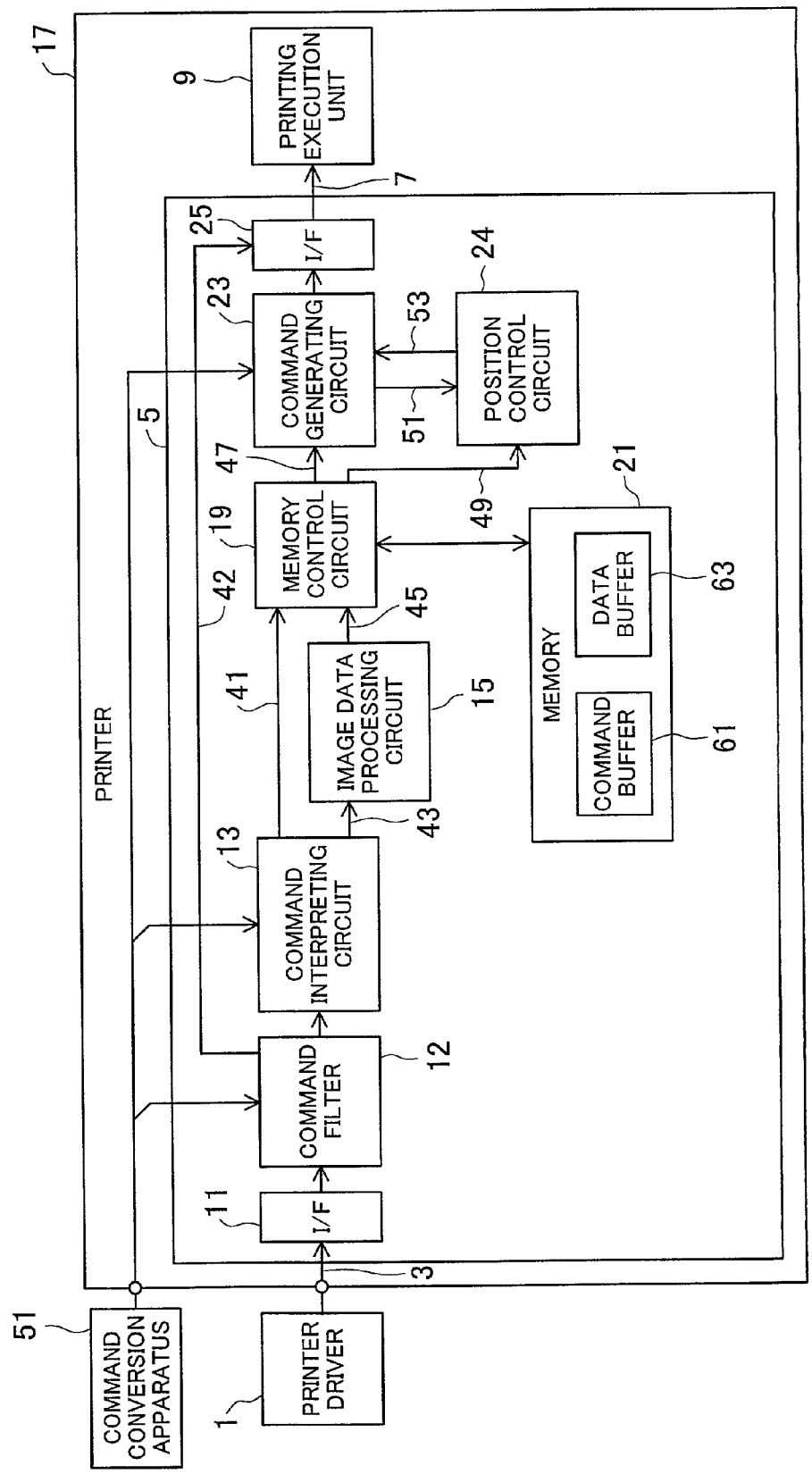
FIG. 1 shows the overall construction of an embodiment of the present invention.

FIG. 1 shows the overall construction of an embodiment of the present invention. A printer 17 connected to a host computer contains a printing execution unit 9 to execute printing, and a command data conversion circuit 5 located between the host computer and the printing execution unit 9. The command data conversion circuit 5 is a hardware circuit comprising an ASIC (Application-Specific Integrated Circuit) and a semiconductor memory chip, for example, and is not a computer that runs software using a CPU. The command data conversion circuit 5 receives print command data including control circuit commands 3 from the printer driver 1, creates printer commands 7 for the printing execution unit 9, and sends these commands 7 to the printing execution unit 9. In this specification, the term "command" refers not only to a command in the narrow sense of the word, but also refers more broadly to parameters and data associated therewith.

Figure 2:
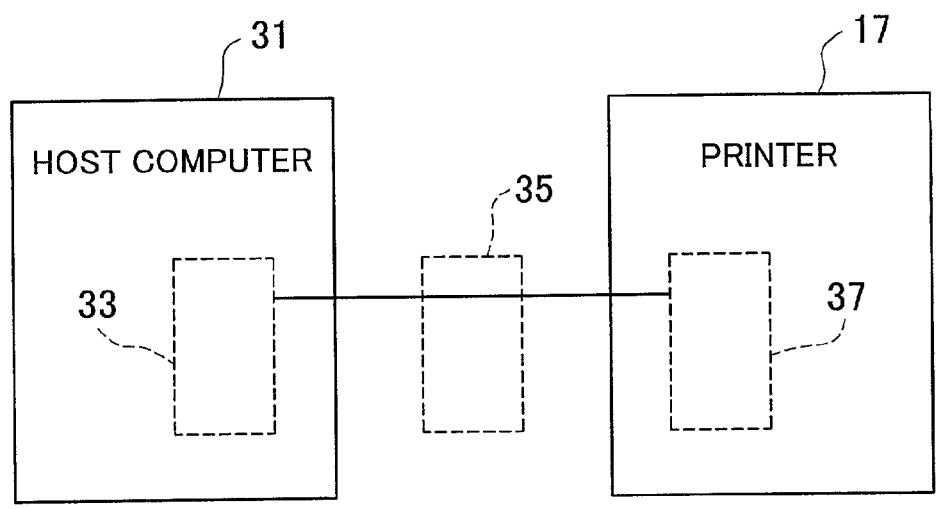
FIG. 2 shows a variation of the placement of the command data conversion circuit (control circuit) 5.

FIG. 2 shows the placement of the command data conversion unit 5. There are three variations of the placement of the command data conversion circuit 5, as shown in FIG. 2. The command data conversion circuit 5 may be (i) built into the host computer 31 as shown by the block 33 in FIG. 2, (ii) built into the printer 17 as shown by the block 37, or (iii) connected to the host computer 31 and to the printing execution unit 9 as shown by the block 35. In the host-based construction, the command data conversion circuit 5 is provided in the form of an option board in the host computer, is directly connected to the CPU bus of the host computer 31, and is connected to the printer 17 via a parallel interface cable (or over a communication network), for example. This construction offers the advantage that the command data conversion circuit 5 may be connected to multiple printers. On the other hand, in the printer-based construction, the command data conversion circuit 5 is provided in the form of an option board in the printer, is directly connected to the CPU bus of the printer 17, and is connected to the host computer 31 via a parallel interface cable (or over a communication network), for example. This construction offers the advantage that the command data conversion circuit 5 may be connected to multiple hosts. In the connected construction, the command data conversion circuit 5 is connected to both the host computer 31 and to the printer 17 via a parallel interface cable (or over a communication network), for example. In each of these constructions, the command data conversion circuit 5 may be created as an ASIC.

As shown in FIG. 1, the command data conversion circuit 5 includes an image data processing circuit 15. This image data processing circuit 15 receives high-resolution raster data (in this embodiment, "full color RGB raster data" comprising 8-bit words in which each color component value of each pixel may be expressed in 256 gradations) and converts this full-color RGB raster data into printer color system-compatible low-resolution raster data (in this embodiment, "binary CMYK raster data" expressed in terms of whether or not a CMYK dot is to be placed at each pixel position) through "color conversion" and "halftone processing". As a result, it is no longer necessary for the printer driver 1 to carry out "color conversion" and "halftone processing" of the original image data to be printed, and the burden on the host computer CPU is significantly reduced. Similarly, the printing execution unit 9 also need not perform "color conversion" and "halftone processing", thereby reducing the burden on the printer CPU. At the same time, because the image data processing circuit 15 of the command data conversion circuit 5 comprises dedicated hardware for the execution of "color conversion" and "halftone processing", such processing is carried out at high speed, thereby increasing the speed of printing.

Incidentally, while the printer driver 1 need not carry out "color conversion" and "halftone processing" in principle, as described above, in this embodiment, the printer driver 1 does not completely abandon this processing function, but rather performs selection in accordance with the type of image. In other words, when the printer driver 1 receives original image data from an application program, it first separates and extracts character and drawing data and natural image data from the original image data. Characters are expressed through character codes and character attribute (size, style) data, and drawings are expressed through function calls and vector data. This character data and drawing data undergo "rasterizing", "color conversion" and "halftone processing" by the printer driver 1, and are converted to binary CMYK raster data, and after this data is compressed, the converted data is incorporated into a control circuit command 3 and sent to the command data conversion circuit 5. On the other hand, the natural image data is typically expressed as RGB raster data. This natural image data does not undergo "color conversion" and "halftone processing" by the printer driver 1, and is compressed, incorporated into a control circuit command 3, and sent to the command data conversion circuit 5 as RGB raster data. Therefore, the image data processing circuit 15 of the command data conversion circuit 5 carries out "color conversion" and "halftone processing" of only the natural image RGB data.

There are two principal reasons that "color conversion" and "halftone processing" of the character and drawing data are carried out by the printer driver 1, but are carried out with regard to the natural image data by the command data conversion circuit 5. One, while such processing of character and drawing data is in general easy, and does not place a large burden on the CPU, such processing of natural image data is intensive, and places a large burden on the CPU. As a result, it is most efficient from the standpoint of processing speed to have this type of intensive processing carried out by the command data conversion circuit 5 comprising dedicated hardware for this purpose, and to relieve the CPU of the duty to perform such processing. Two, character and drawing data are preferable to be high resolution data because it must be printed such that edges are well-defined. As concerns data format, high-resolution full-color RGB raster data comprises an extremely large amount of data. But binary CMYK data does not comprise such a large amount of data even where it has a high resolution. Therefore, if data is sent from the printer driver 1 to the command data conversion circuit 5 in binary CMYK raster data format, data forwarding may be carried out in a shorter amount of time.

The construction and operation of the command data conversion circuit 5 will be explained in detail below.

As shown in FIG. 1, the command data conversion circuit 5 has a host interface circuit 11, a command filter 12, a command interpreting circuit 13, an image data processing circuit 15, a memory control circuit 19, a memory 21, a command generating circuit 23, a position control circuit 24 and a printer interface circuit 25.

The host interface circuit 11 receives control circuit commands described below from the printer driver 1 of the host device (not shown in the drawing). Of those received commands, the command filter 12 sends to the command interpreting circuit 13 only those commands that can be understood by the command interpreting circuit 13. The command interpreting circuit 13 interprets the received control circuit commands, determines the type of command each represents, and forwards the data included in each command to the appropriate destination (i.e., the memory control circuit 19 or the image data processing circuit 15) in accordance with the type of command. The image data processing circuit 15 receives natural-image full-color RGB raster data from the command interpreting circuit 13, carries out color conversion and halftone processing, and generates binary CMYK raster data.

The memory control circuit 19 receives back end parameters described below (parameters necessary to execute printing based on binary CMYK raster data) from the command interpreting circuit 13, and stores them in the command buffer 61 of the memory 21. The memory control circuit 19 receives binary CMYK raster data for the character and drawing data from the command interpreting circuit 13, and receives binary CMYK raster data for the natural image data from the image data processing circuit 15, and stores them in the data buffer 63 of the memory 21. The image data processing circuit 15 also reads out the back end parameters from the command buffer 61 and sends them to the command generating circuit 23, and then reads out the binary CMYK raster data from the data buffer 63 and sends it to the position control circuit 24.

The position control circuit 24 converts the binary CMYK data received from the memory control circuit 19 into data (referred to below as "interlace CMYK raster data") having a format compatible with interlace printing or overlap printing, and then sends it to the command generating circuit 23. The command generating circuit 23 generates printer commands to initialize the printing execution unit 9 based on the back end parameters from the memory control circuit 19, and thereafter generates printer commands to forward the interlace CMYK raster data to the printing execution unit 9 based on the interlace CMYK raster data from the position control circuit 24. The printer interface circuit 25 forwards the printer commands generated by the command generating circuit 23 to the printing execution unit 9.

B. Interpreting of Control Circuit Commands in Print Command Data

The functions of the various components of the command data conversion circuit 5 are explained in more detail below.

The host interface circuit 11 receives a series of control circuit commands 3 from the printer driver 1 of the host device, and sends them to the command interpreting circuit 13.

The command interpreting circuit 13 places the control circuit commands from the printer driver 1 of the host device in an FIFO memory (not shown in the drawing) of the command interpreting circuit 13, reads them out and interprets them in the order of receipt, and determines the type of command each command represents. An example of these control circuit commands is shown in FIGS. 3(A), 3(B), 4, 5(A), 5(B), and 6(A)–6(C) as the eight commands C1 through C8, in accordance with the order such commands are sent from the printer driver 1.

Figure 3A:
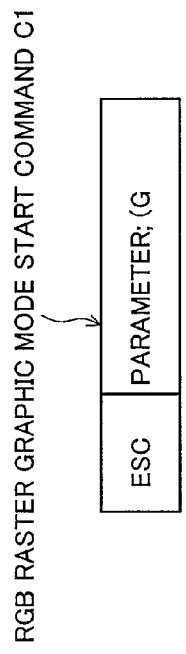
FIGS. 3(A) and 3(B) show the contents of the RGB raster graphic mode start command C1 and the image conversion parameter setting command C2.

(1) RGB Raster Graphic Mode Start Command C1:

FIG. 3(A) shows the RGB raster graphic mode start command C1. This command includes an associated parameter, which has the format of an "<ESC> parameter", as shown in FIG. 3(A). I this specification, a symbol in the angle brackets "< >" denotes a command code. The parameter is "(G". This command instructs the command data conversion circuit 5 to enter "RGB raster graphic mode". The "RGB raster graphic mode" is a mode that carries out an operation to convert the full-color RGB raster data sent from the host device into binary CMYK raster data and output it to the printer. The command interpreting circuit 13 accepts the following commands C2 through C8 only when RGB raster graphic mode is active.

(2) Image Conversion Parameter Setting Command C2

Figure 3B:
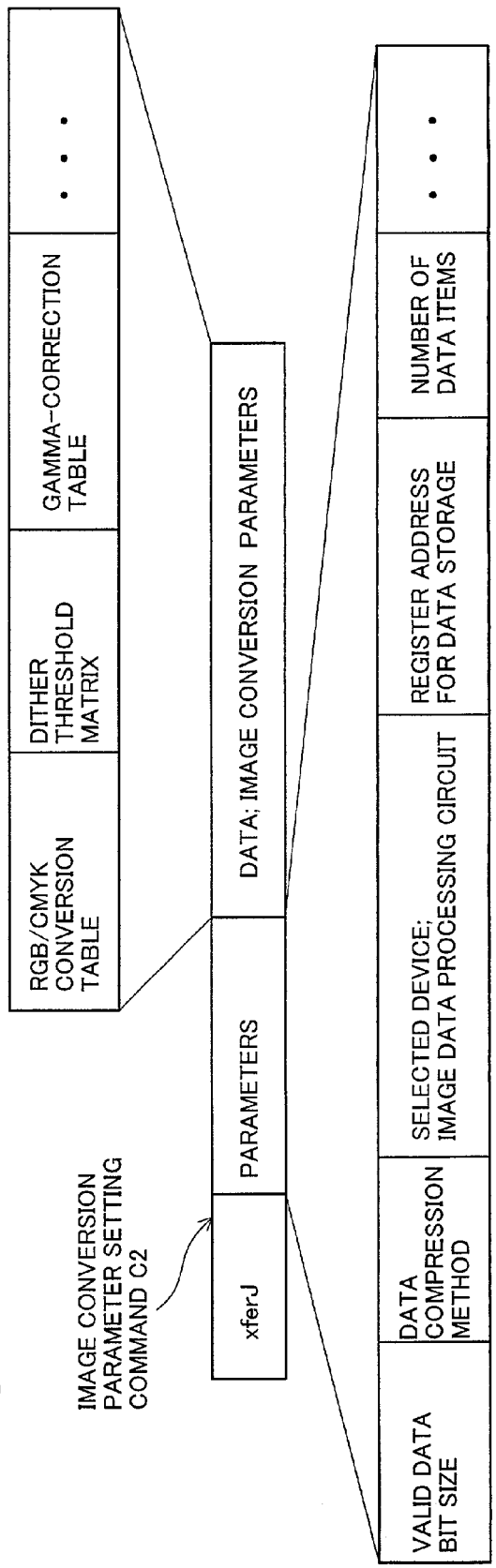

FIG. 3(B) shows the contents of the image conversion parameter setting command C2. This command includes associated parameters and data, and has the format "<xferJ> parameters data", as shown in the middle part of FIG. 3(B). This command instructs the command data conversion circuit 5 to set in the image data processing circuit 15 the parameters necessary to perform color conversion and halftone processing (hereinafter "image conversion parameters").

The data forwarding commands containing the <xferj> command code comprise, in addition to the "image conversion parameter setting command", a "back end parameter setting command" and an "RGB data forwarding command" described below. These data forwarding commands include parameters and data. The parameters for each command include, as shown in the bottom part of FIG. 3(B), instructions relating to "valid data bit size", "data compression method", "selected device as a data forwarding destination", "data storage register address in device", "number of data items", etc. The type of command among the three types of commands may be determined from the "selected device" and "data storage register address in device" parameters. The "selected device" parameter in the "image conversion parameter setting command C2" is the image data processing circuit 15, and the data is the "image conversion parameters". The "image conversion parameters" include, for example, various types of look-up tables such as an RGB/CMYK conversion table for color conversion, a dithering threshold matrix used in dithering, and a gamma-correction table used in gamma correction.

Upon receiving the image conversion parameter setting command, the command interpreting circuit 13 sends the register address in the parameters for this command and the data associated with this command (i.e., the image conversion parameters) to the image data processing circuit 15 as indicated by the arrow 43 in FIG. 1. When this occurs, if the image conversion parameters are compressed, the command interpreting circuit 13 sends the image conversion parameters to the image data processing circuit 15 after decompressing them. The image data processing circuit 15 sets the image conversion parameters in the specified register address. In this way, the configuration of the image data processing circuit 15 is set so that color conversion and halftone processing of the subsequently received full-color RGB raster data are correctly performed.

Each command from the "image conversion parameter setting command" to the "page end command" described below is repeated until the final page of the print job is processed. It is acceptable if the "image conversion parameter setting command" and the "back end parameter setting command" described in the next section are sent only once at the beginning of the print job.

(3) Back End Parameter Setting Command C3

FIG. 4 shows the contents of the back end parameter setting command C3. This command includes associated parameters and data, and has the format "<xferJ> parameters data", as shown in the middle part of FIG. 4. This command instructs the command data conversion circuit 5 to set in the components of the command data conversion circuit 5 (typically, the position control circuit 24 described below), as well as in the printer, the various parameters necessary to correctly control the printer mechanisms (such as a print head, carriage and paper feed device of an inkjet printer) and perform printing onto the printing paper. These parameters are required by the processing modules located downstream from the image data processing circuit 15 and by the printing execution unit 9 (back end), and in that sense are called "back end parameters". The "selected device" indicated among the parameters in the "back end parameter setting command C3" is the back end, and the data comprises the back end parameters. The back end parameters include the horizontal and vertical resolution of the CMYK raster image, the number of pixels in one raster line (one horizontal line), the number of raster lines in a page, the page length, the top, bottom and left margins, the basic paper feed amount, the dot size instruction, one-directional vs. bidirectional printing, the number of passes (or the nozzle spacing) when interlace printing is performed, the number of nozzles used, and the paper forwarding amounts of the variable paper feeding.

In this specification, this "back end parameter setting command" and the "image conversion parameter setting command" described above (see section (2)) are collectively referred to as "parameter setting commands".

When receipt of the entire "image conversion parameter setting command" (see section (2)) has been completed, the "back end parameter setting command" is input. When this command is received, the command interpreting circuit 13 sends the register address in the parameters for this command and the associated data (i.e., the back end parameters) to the memory control circuit 19, as indicated by the arrow 41 in FIG. 1.

(4) RGB Data Forwarding Command C4

FIG. 5(A) shows the contents of the RGB data forwarding command C4. This command includes associated parameters and data, and has the format "<xferJ> parameters data", as shown in the upper part of FIG. 5(A). This command instructs supplies the full-color RGB raster data for natural images for each raster line in the page (one horizontal line) to the command data conversion circuit 5 and instructs that color conversion and halftone processing be performed. The "selected device" in the parameters for this command is the image data processing circuit 15, and the data associated with this command is the full-color RGB raster data for one raster line (or for an individual segment of one raster line). This RGB data forwarding command corresponds to the "first data forwarding command" in the claims set forth in this specification. Furthermore, the three colors of red, green and black (RGB) constitute the "first color system", and the full-color RGB raster data for one raster line (or for an individual segment of one raster line) corresponds to the "first image data".

When receipt of the entire "back end parameter setting command" (see section (3)) has been completed, the "raster image forwarding command" for each raster line is input. The "raster image forwarding command" includes the "RGB data forwarding command" and the "CMYK data forwarding command" described below. When a raster line contains both natural images and characters and/or drawings, the "RGB data forwarding command" is input for the natural images, and then the "CMYK data forwarding command" is input for the characters and/or drawings. If the raster line contains only natural images, only the "RGB data forwarding command" is input. If the raster line contains only characters and/or drawings, only the "CMYK data forwarding command" is input. The command interpreting circuit 13 sends the register address in the parameters in the "CMYK data forwarding command" and the data associated with this command (i.e., the natural-image full-color RGB raster data) to the image data processing circuit 15 as shown in the arrow 43 in FIG. 1. If the full-color RGB raster data in the command is compressed, the command interpreting circuit 13 sends it to the image data processing circuit 15 after decompressing it.

(5) CMYK Data Forwarding Command C5

FIG. 5(B) shows the CMYK data forwarding command C5. This command includes associated parameters and data, and has the format "<xferC> parameters data", as shown in FIG. 5(B). This command supplies to the command data conversion circuit 5 characters/drawing binary CMYK raster data for each raster line (one horizontal line) in the page. The data in this command comprises character/drawing binary CMYK raster data for one raster line (or for an individual segment of one raster line) generated by the printer driver 1. This CMYK data forwarding command comprises the "second data forwarding command" described in the claims of this specification. The four colors of cyan, magenta, yellow and black (CMYK) constitute the "second color system" described in the claims, and the character/drawing binary CMYK raster data drawings for one raster line (or for an individual segment of one raster line) constitutes the "second image data" described therein.

This "CMYK data forwarding commands" is sent for the raster data that includes both (1) natural images and (2) characters and/or drawings, or raster data for only (2) characters and/or drawings.

The command interpreting circuit 13 sends the "CMYK data forwarding command" data (i.e., the character/drawing binary CMYK raster data) to the memory control circuit 19 as indicated by the arrow 41 in FIG. 1.

(6) Raster End Command C6

Figure 6A:
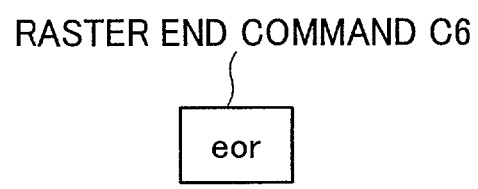
FIGS. 6(A), 6(B) and 6(C) show the raster end command C6, the page end command C7 and the RGB raster graphic mode end command C8.

FIG. 6(A) shows the raster end command C6. This command does not have any associated parameters or data, and has the format "<eor>". This command provides notification that one raster line has been completed.

The "RGB data forwarding command" (see section (4)), the "CMYK data forwarding command" (see section (5)), and the "raster end command" are sent repeatedly until the final raster line on the page is processed.

(7) Page End Command C7

Figure 6B:
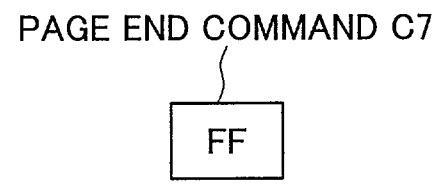

FIG. 6(B) shows the page end command C7. This command does not have any associated parameters or data, and has the format "<FF>". This command indicates a page return.

When the "raster end command" (see section (6)) for the last raster line on the page has been input, the next input command is the "page end command". When this command is input, the command interpreting circuit 13 stops receiving new commands from the host device until a notification is received from the command generating circuit 23 indicating that forwarding of all of the data regarding the previous page has been completed. When this notification is received, the command interpreting circuit 13 begins receiving commands regarding the next page.

Each command from the "image conversion parameter setting command" (see section (2)) to this "page end command" is repeated until the last page of the print job is processed.

(8) RGB Raster Graphic Mode End Command C8

Figure 6C:
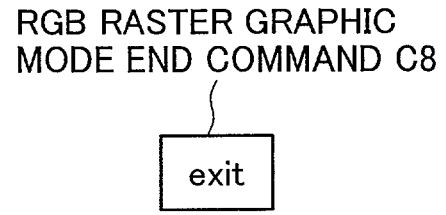

FIG. 6(C) shows the RGB raster graphic mode end command C8. This command does not have any associated parameters or data, and has the format "<exit>". This command issues a notification that the RGB raster graphic mode should be ended. When the RGB raster graphic mode is ended, the command interpreting circuit 13 does not accept any other commands until the next "RGB raster graphic mode start command" (see section (1)) is received.

Following the "page end command" (see section (7)) for the final page of the print job, the "RGB raster graphic mode end command" is input. When this occurs, the command interpreting circuit 13 ends the RGB raster graphic mode and thereafter accepts no commands other than "<ESC> (G", i.e., the "RGB raster graphic mode start command" (see section (1)).

The command interpreting circuit 13 determines the type of command from the command code or the command code and parameters of the received control circuit command. It is determined from the command code whether the command is an RGB raster graphic mode start command, an "<xferJ>" command, a CMYK data forwarding command, a raster end command, a page return command, or an RGB raster graphic mode end command. Where the received control circuit command is an "<xferJ>" command, it is determined from the "selected device" in the parameters whether the command is a back end parameter setting command or a different command (i.e., an image conversion parameter setting command or an RGB data forwarding command).

The command interpreting circuit 13 performs different operations based on the command determination results, as described above.

Figure 7:
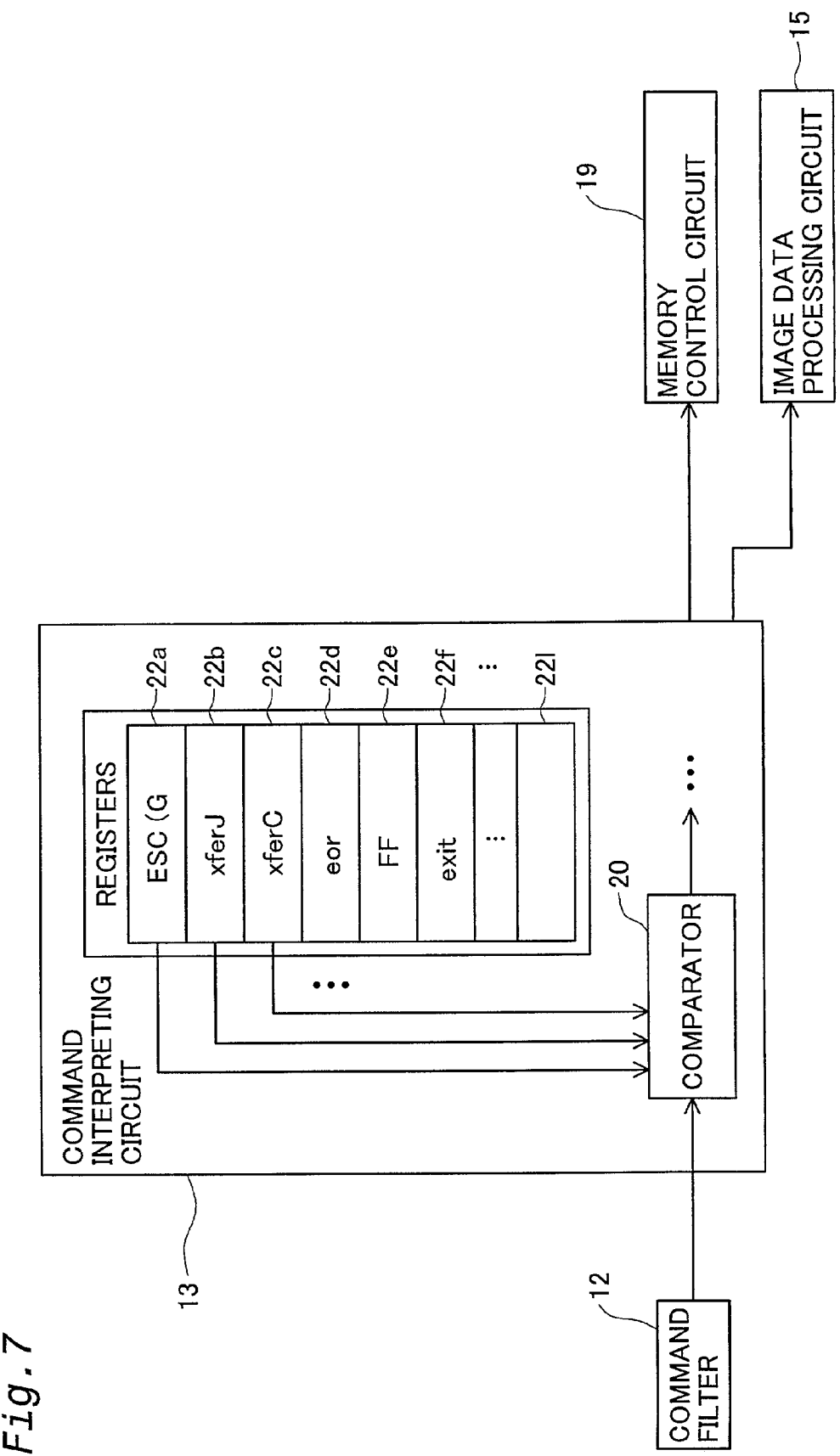
FIG. 7 shows the comparator 20 and the registers 22a through 22l in the command interpreting circuit 13.

FIG. 7 shows the comparison circuit 20 and the registers 22a through 22f in the command interpreting circuit 13. The command interpreting circuit 13 has a comparator 20 and twelve registers 22a through 22l, as shown in FIG. 7. The registers 22a through 22l comprise non-volatile rewritable memories. Stored in these registers 22a through 22l are their respective command codes such as "<ESC> (G", "<xferJ>", "<xferC>", "<eor>", "<FF>", "<exit>." Furthermore, in connection with the RGB raster graphic mode start command C1, the command code "<ESC> (G" that includes the parameter "(G" is stored. In this specification, the term "command" refers not only to a command in the narrow sense of the word, but also refers more broadly to parameters and data associated with the command. The command interpreting circuit 13 compares the command codes stored in the registers 22a through 22l and control circuit commands 3 in the print command data using the comparator 20, and identifies the received control circuit commands 3. These registers 22a through 22l are the "command registers" described in the claims herein. Regarding the "<xferJ>" command code, it is determined in the next stage based on the "selected device" and the "data storage register address in device" whether the command is an "image conversion parameter setting command", a "back end parameter setting command" or an "RGB data forwarding command." Here, the registers 22a through 22l were previously identified as non-volatile rewritable memories, but they may also comprise static RAMs or dynamic RAMs. In other words, any medium may be used as the registers 22a through 22l so long as multiple commands may be rewritten and stored therein.

Figure 8A:
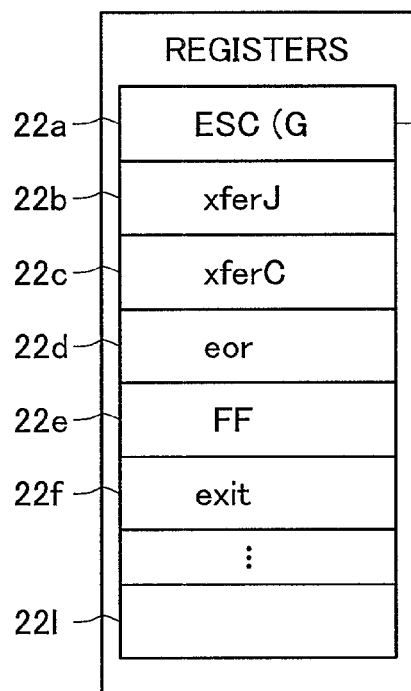
FIGS. 8(A) and 8(B) show the rewriting of the color specification registers.
Figure 8B:
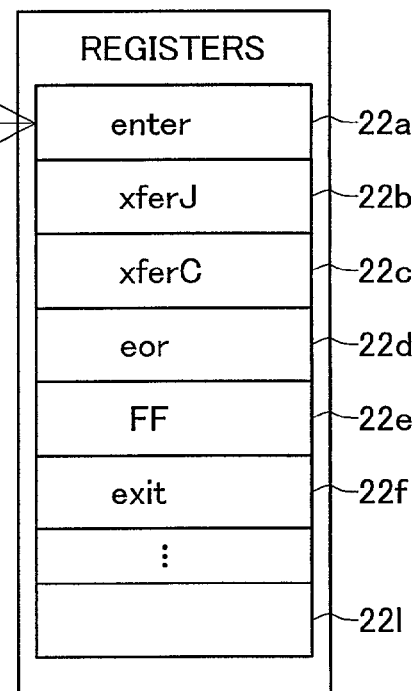

FIGS. 8(A) and (B) show the color specification registers when the contents thereof are rewritten. The contents of the registers 22a through 22l may be rewritten by the command rewrite device 51 (see FIG. 1) connected to the printer. Therefore, where the command code assigned to each command is changed, if the command code rewrite device 51 is connected and newly-assigned command codes are rewritten into the registers 22a through 22l, the command interpreting circuit 13 can correctly interpret subsequent commands. For example, where the command code for the "RGB raster graphic mode start command" is changed from "<ESC> (G" to "enter", if the contents of the register 22*a* are rewritten to "enter" as shown in FIG. 8, when the code "enter" is input, the code may be correctly identified as an "RGB raster graphic mode start command." The command interpreting unit 13 here corresponds to the "command interpreter" described in the claims herein, and the registers 22*a* through 22*l* correspond to the "command registers" described in the claims herein. The image data processing circuit 15 positioned downstream from the command interpreting circuit 13 corresponds to the "processor that receives at least either of the commands and the associated data and executes prescribed processing." Furthermore, the printer 17 may incorporate multiple groups of elements corresponding to each element described in the claims. Another combination of elements corresponding to each element described in the claims will be described together with the description of the command filter 12.

C. Image Processing, Raster Data Overlapping

The image data processing circuit 15 shown in FIG. 1 first receives the various image conversion parameters and the register addresses for those parameters from the command interpreting circuit 13. The image data processing circuit 15 stores the received image conversion parameters in the specified register address. In this way, a configuration of the image data processing circuit 15 is created so that color conversion and halftone processing may be correctly performed. The image data processing circuit 15 then receives natural-image full-color RGB data and the register address for this data for each raster line from the command interpreting circuit 13. When this occurs, the image data processing circuit 15 carries out color conversion and halftone processing, converts the received full-color RGB raster data for each raster line into binary CMYK raster data, and sends the data to memory control circuit 19 as indicated by the arrow 45 in FIG. 1. The image data processing circuit 15 corresponds to the "processor that receives at least either of the commands and the associated data and executes prescribed processing" described in the claims herein.

The memory control circuit 19 first receives back end parameters and the register address for those parameters from the command interpreting circuit 13. The memory control circuit 19 accumulates the received back end parameters and their register address in the command buffer 61 of the memory 21. The memory control circuit 19 then receives the natural-image binary CMYK raster data for each raster line from the image data processing circuit 15 and receives the character/drawing binary CMYK raster data for each raster line from the command interpreting circuit 13. The memory control circuit 19 accumulates the received binary CMYK raster data for each raster line in the data buffer 63 of the memory 21. When this occurs, where both natural-image CMYK data and character/drawing CMYK data are received regarding the same raster line, the memory control circuit 19 combines the natural-image CMYK data and character/drawing CMYK data (through OR calculation) and writes the data into the data buffer 63. In every time when the binary raster data for each raster line finishes being received, the memory control circuit 19 receives a raster end command from the command interpreting circuit 13 and recognizes the end of each raster line. This memory control circuit 19 corresponds to the "data synthesizer" described in the claims herein. Here, the sent image data is synthesized at the raster data stage, but it is acceptable if all of the image data is synthesized before raster data is generated from the image data.

D. Printer Command Generation

Immediately after the RGB raster graphic mode is activated, the memory control circuit 19 receives the command request "send command" from the command generating circuit 23 described below. The memory control circuit 19 writes the back end parameters and their register address into the command buffer 61, and in response to the above request, it reads out the back end parameters and their register address from the command buffer 61 in the order in which they were written in and forwards them to the command generating circuit 23 as indicated by the arrow 47 in FIG. 1. When forwarding of all of the back end parameters is completed, the memory control circuit 19 next receives the data request "send specified raster data" from the position control circuit 24. When this occurs, the memory control circuit 19 reads out from the data buffer 63 the binary CMYK raster data specified by the above data request and forwards it to the position control circuit 24 as indicated by the arrow 49 in FIG. 1.

Immediately after the RGB raster graphic mode is activated, the command generating circuit 23 issues the command request described above to the memory control circuit 19, and when it receives back end parameters and their register address from the memory control circuit 19, it stores the back end parameters in the specified register address. When all of the parameters have been stored in this register, the command generating circuit 23 sends, among the back end parameters, parameters required by the position control circuit 24 described below (which in actuality comprise nearly all of the back end parameters) to the position control circuit 24, as indicated by the arrow 51 in FIG. 1. When this is done, the position control circuit 24 becomes appropriately configured, that is, it becomes able to determine the specifications for interlace printing or overlap printing based on the back end parameters.

The command generating circuit 23 thereupon begins generating a series of printer commands, and sequentially sends the generated printer commands to the printing execution unit 9 via the parallel interface unit 25. In this process, the command generating circuit 23 first creates an initial command representing a job start declaration and sends it to the printing execution unit 9, and thereafter, using the back end parameters required by the printer, creates an initializing command that carries out initialization of the printer and sends it to the printing execution unit 9. The command generating circuit 23 then requests CMYK raster data from the position control circuit 24, receives interlace CMYK raster data from the position control circuit 24, converts this data into a printer command for transmission of CMYK data, and sends the resulting command to the printing execution unit 9. As described below, because interlace CMYK raster data required by the print head of the printing execution unit 9 is sent from the position control circuit 24 for each pass (each horizontal scanning) of the print head, the command generating circuit 23 transmits the CMYK raster data for each pass to the printing execution unit 9, and in every time when the transmission of the CMYK data for each pass is completed, a paper feed command to feed the paper forward to the position for the next pass is sent to the printing execution unit 9.

The position control circuit 24 sends the above data request to the memory control circuit 19 in response to the above request from the command generating circuit 23, receives binary CMYK raster data from the memory control circuit 19, converts this raster data into interlace CMYK data, and sends it to the command generating circuit 23 as shown by the arrow 53 in FIG. 1. In this process, the position control circuit 24 determines for each pass (each horizontal scanning) of the print head, based on the initially set back end parameters, the specifications for optimal interlace printing and overlap printing for the image to be printed, i.e., more specifically, which dot pixel should be formed every how many pixels by each dot forming element (such as an inkjet nozzle) of the print head of the printing execution unit 9. The position control circuit 24 then requests and receives from the memory control circuit 19 CMYK raster data for the dots to be formed by each dot forming element determined as described above, and then creates interlace CMYK data to be provided to each dot forming element for each pass by adding null data corresponding to each non-printed dot to the received CMYK data, and thereafter sends this interlace CMYK data to the command generating circuit 23. In this way, the position control circuit 24 determines the specifications for optimal interlace printing and overlap printing based on the back end parameters, creates interlace CMYK raster data required by the print head when printing is performed based on such specifications, and sends the interlace CMYK raster data to the command generating circuit 23.

The command generating circuit 23 converts the received binary CMYK raster data for each pass into a "CMYK raster data forwarding command" for transmission to the printing execution unit 9, and then transmits this command to the printing execution unit 9 via the printer interface circuit 25. After the "CMYK raster data forwarding command" for each pass, the command generating circuit 23 generates a "paper feed forward command" and sends it to the printing execution unit 9. The printer interface circuit 25 sends the printer commands received from the command generating circuit 23 to the printing execution unit 9.

Figure 9:
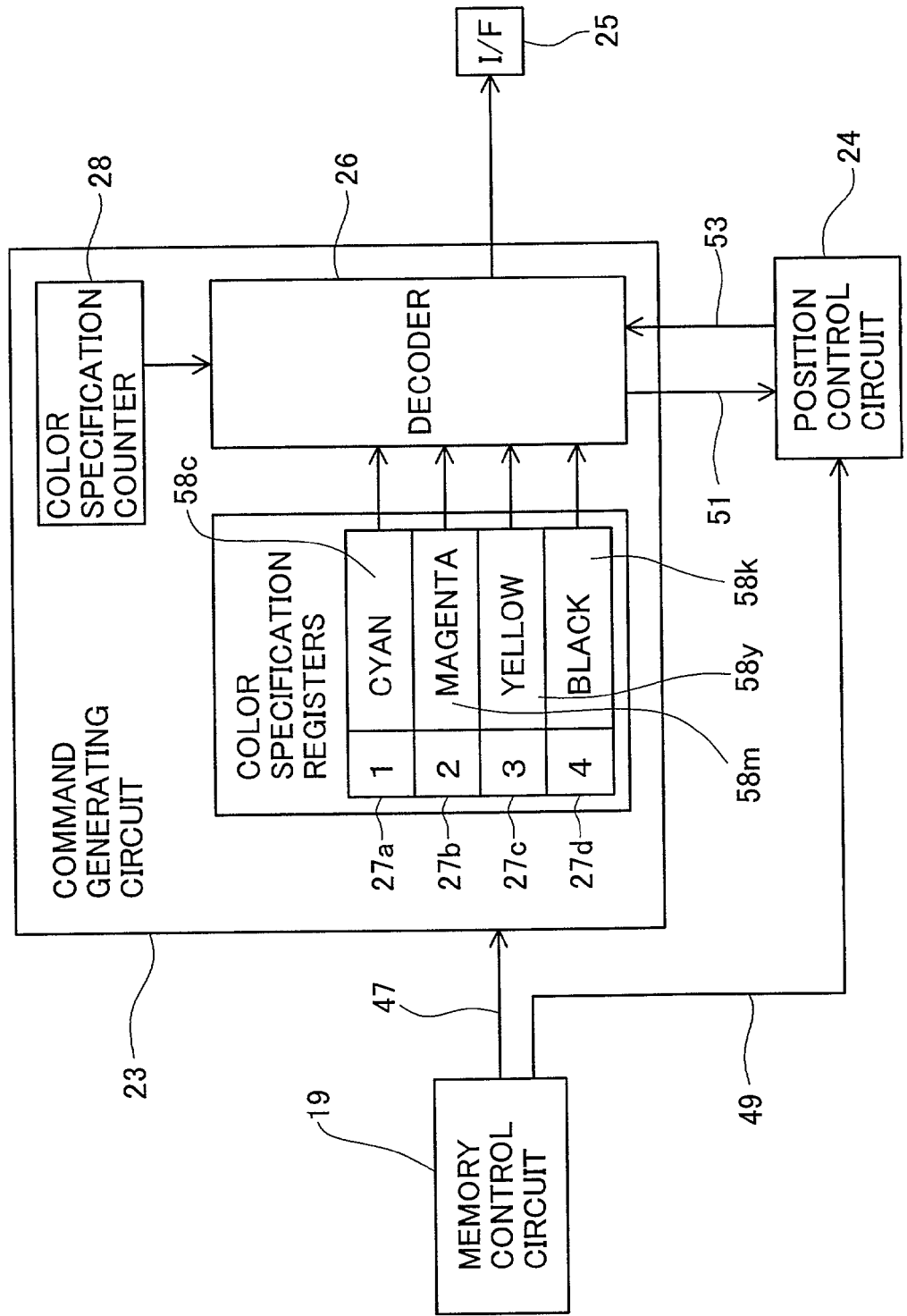
FIG. 9 shows the decoder 26, the color specification registers 27a through 27d, and the color specification counter 28 in the command generating circuit 23.

FIG. 9 shows a decoder 26 in the command generating circuit 23, color specification registers 27a through 27d, and a color specification counter 28. The color specification registers 27a through 27d comprise non-volatile rewritable memories. These color specification registers 27a through 27d each have addresses 1 through 6. Each color specification register stores a color specification parameter of the raster data commands among the printer commands 7. Here, for example, the cyan color specification parameter 58c is stored in the color specification register 27a, the magenta color specification parameter 58m is stored in the color specification register 27b, the yellow color specification parameter 58y is stored in the color specification register 27c, and the black color specification parameter 58k is stored in the color specification register 27d. These color specification parameters correspond to the "ink color data index" described in the claims herein, and the color specification registers 27a through 27d correspond to the "ink color data registers" described therein.

Figure 10:
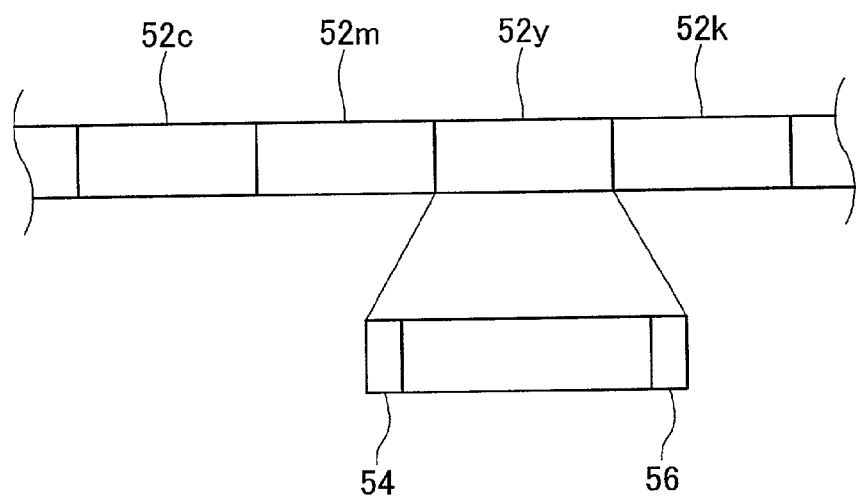
FIG. 10 shows the contents of the interlace CMYK raster data for each pass sent from the position control circuit 24 to the command generating circuit 23.

FIG. 10 shows the contents of the interlace CMYK raster data for each pass sent from the position control circuit 24 to the command generating circuit 23. When printing is performed, this printer carries out main scanning in which at least one of either the print head or the print medium is moved, while ink droplets are expelled from the print head, and the ink droplets are caused to adhere to the print medium, thereby forming dots. A single scanning in a single direction is called a "pass." The interlace CMYK raster data for each pass sent from the position control circuit 24 to the command generating circuit 23 comprises image data sets 52c, 52m, 52y and 52k for each color of cyan, magenta, yellow and black, respectively, and is sent in this order each time. Each image data set contains a header in the top area thereof, and a code 56 indicating that the image data set has ended is located at the end thereof. The color specification counter 28 (see FIG. 9) is initialized before the image data sets are sent, and thereafter increases in value by one each time an image data set for each color is sent. The color specification counter 28 increases in value by one each time a code 56 located at the end of each image data set is received. The decoder 26 adds the color specification parameter 58c, 58m, 58y or 58k stored in the color specification register for a prescribed address to this image data set, with reference to the value of the color specification counter 28. For example, if the cyan image data set 52c is first sent from the position control circuit 24, the value of the counter changes from 0 to 1. The decoder 26 then adds the cyan color specification parameter 58c stored in the color specification register 27a for the address 1 to the beginning of the sent image data set 52c. When the magenta image data set 52m is then sent second, the value of the color specification counter 28 becomes 2, and the decoder 26 adds the magenta color specification parameter 58m stored in the color specification register 27b for the address 2 to the beginning of the sent image data set 52m. Similarly, the color specification parameters 58y and 58k of the printer data forwarding command are respectively added to the yellow and black image data sets 52y and 52k. The decoder 26 corresponds to the "processor that receives multiple image data sets corresponding to multiple inks used in the printing system and performs prescribed processing" described in the claims herein.

Figure 11:
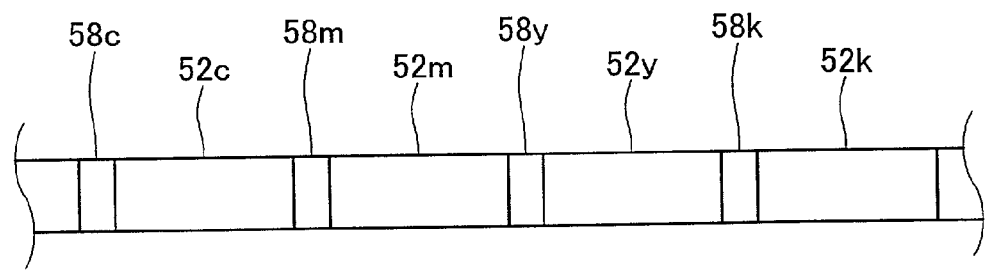
FIG. 11 shows the contents of the interlace CMYK raster data for each pass sent from the command generating circuit 23 to the printing execution unit 9.

FIG. 11 shows the contents of the interlace CMYK raster data for each pass sent from the command generating circuit 23 to the printing execution unit 9. As described above, the command generating unit 23 generates "CMYK raster data forwarding commands" while adding color specification parameters to the image data sets for each color, and sends them to the printing execution unit 9. As a result, the interlace CMYK raster data for each pass sent to the printing execution unit 9 has the configuration shown in FIG. 11.

Figure 12A:
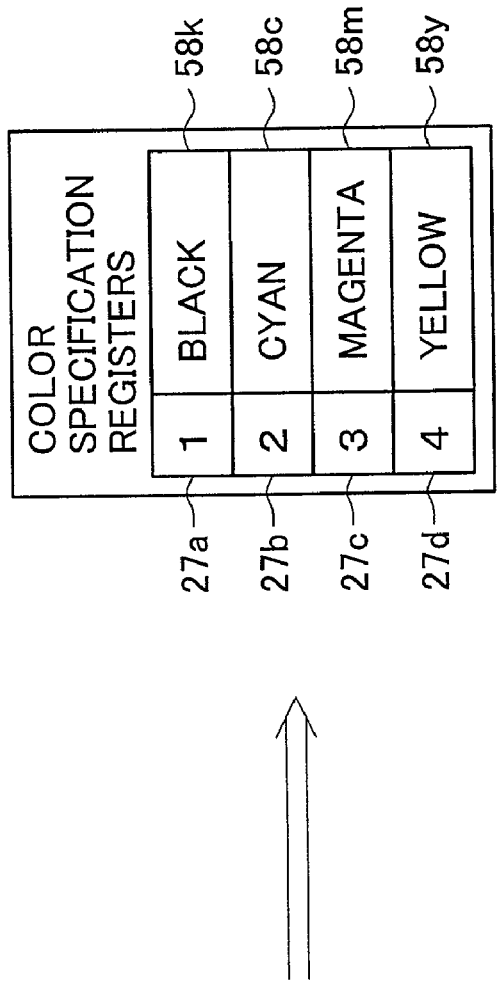
FIGS. 12(A) and (B) show the rewriting of the color specification registers 27a through 27d.
Figure 12B:
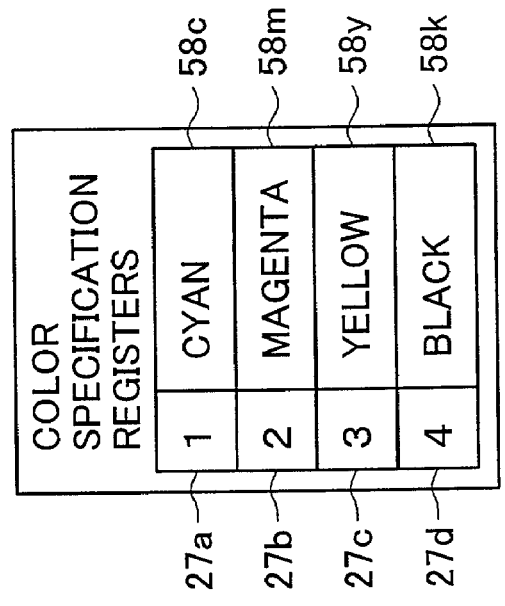

FIGS. 12(A) and 12(B) show the rewriting of the color specification registers 27a through 27d. The contents of each color specification register 27a through 27d may be rewritten by the command rewriting device 51 (see FIG. 1) connected to the printer. Therefore, where the order in which the image data sets for each color sent from the position control circuit 24 changes, by rewriting the contents of the color specification registers 27a through 27d, the correct color specification parameter may be added even after the above order changes. For example, where the order of image data sets for each color sent from the position control circuit 24 is black 52k, cyan 52c, magenta 52m and yellow 52y, the color specification registers are rewritten so that the color specification parameter 58k for black is stored in the color specification register 27a, the color specification parameter 58c for cyan is stored in the color specification register 27b, the color specification parameter 58m for magenta is stored in the color specification register 27c, and the color specification parameter 58y for yellow is stored in the color specification register 27d, as shown in FIG. 12. When the contents of the color specification registers are rewritten in this way, the color specification parameter 58k for black stored in the color specification register 27a for the address 1 is added to the image data set 52k initially sent from the position control circuit 24, and the color specification parameter 58c for cyan stored in the color specification register 27b for the address 2 is added to the image data set 52c sent second. Similarly, the color specification parameters 58m and 58c are added to the image data sets 52m and 52y for magenta and yellow, respectively.

Here, ink color data (color specification parameters) is added to image data sets sent in a certain order, but the present invention may be applied in any apparatus so long as corresponding prescribed data is added to data sets sent in a certain order. For example, when data sets without parameters or commands are sent in a certain order to the command interpreting circuit 13, it is acceptable if the present invention is applied to the command interpreting circuit 13, that the command interpreting circuit 13 adds parameters or commands to the data sets.

E. Allocation of Commands

The command data conversion circuit 5 described above is constructed such that it may also be applied where a conventional printer driver which generates only printer commands is used in a host computer. In other words, once the RGB raster graphic mode is no longer present, command interpretation is not performed by the command interpreting circuit 13 of the command data conversion circuit 5 unless an RGB raster graphic mode start command "<ESC> (G" is received once more. Before the command interpreting circuit 13, the command filter 12 catches commands other than the commands described above sent from the host when the RGB graphic mode is present and sends them to the printer interface circuit 25 via the through-pass 42 not to the command interpreting circuit 13. The printer interface circuit 25 sends the commands as is to the printing execution unit 9. Therefore, the printer commands issued by the conventional printer driver bypass the command data conversion circuit 5 and are sent to the printing execution 9, the printing execution unit 9 can be driven in the conventional manner.

Figure 13:
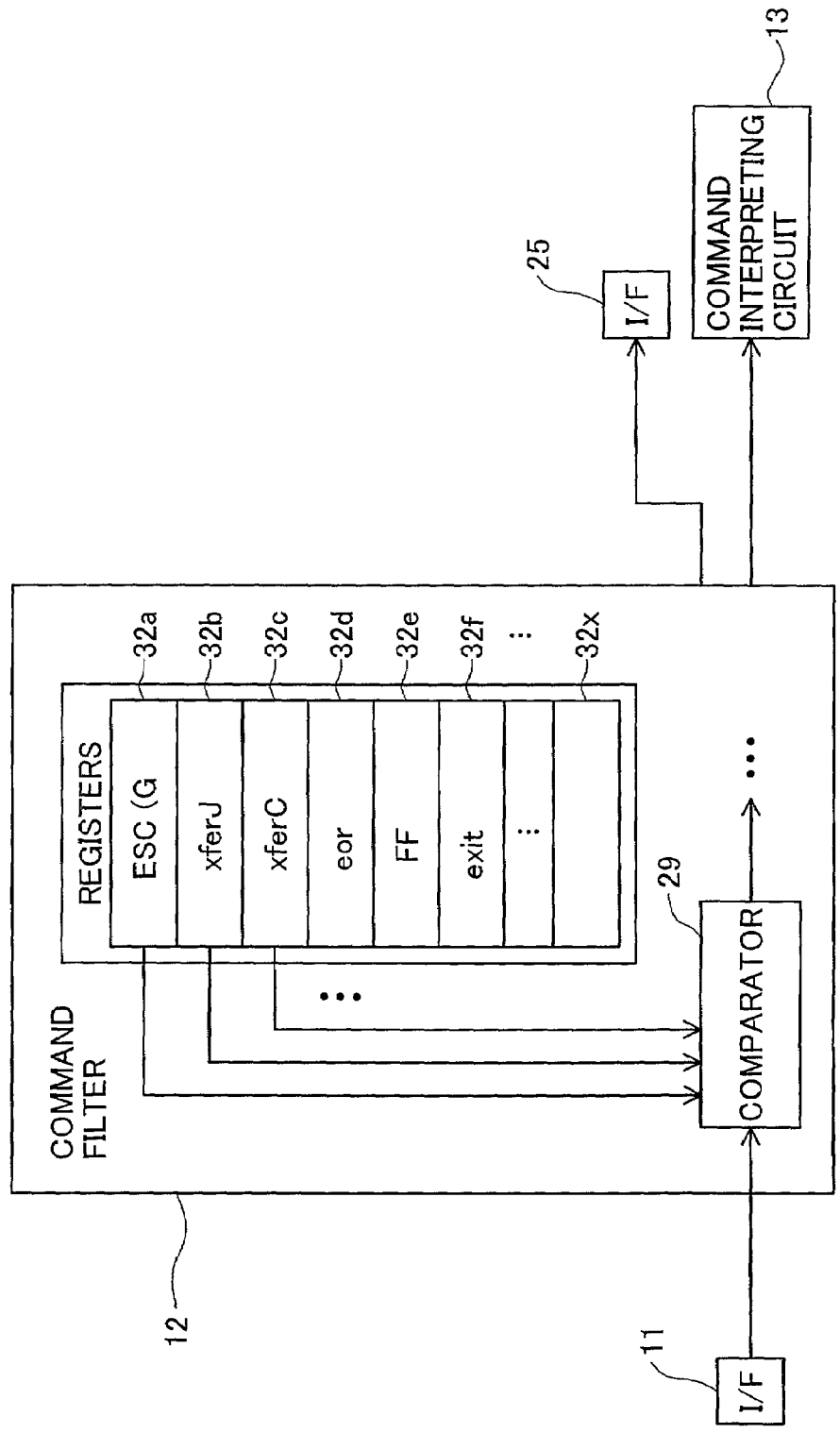
FIG. 13 shows the comparator 29 and the registers 32a through 32l in the command filter 12.

FIG. 13 shows a comparator 29 and registers 32a through 32f of the command filter 12 (see FIG. 1). The registers 32a through 32x comprise non-volatile rewritable memories. In the registers 32a through 32l, command codes are stored that can be understood by the command interpreting circuit 13, such as "<ESC> (G", "<xferJ>", "<xferC>", "<eor>", "<FF>", "<exit>." And also command codes of the command group are stored that can be understood directly by the printing execution unit 9. The command filter 12 compares the command codes stored in the registers 32a through 32x and the control circuit commands 3 in the print command data using the comparator 29, and sends command codes that may be understood by the command interpreting circuit 13 to the command interpreting circuit 13. Command codes other than these that may be understood directly by the printing execution unit 9 are sent to the printer interface circuit 25. Command codes not falling under these categories are ignored. Where the command codes are changed, the contents of the registers 32a through 32l can be rewritten using the command rewriting device 51 (see FIG. 1). If contents of the registers 32a through 32l are rewritten into new command codes, the correct commands can be sent to the command interpreting circuit 13 even after the command codes have changed. Here, the command filter 12 corresponds to the "command interpreter" described in the claims herein, and the registers 32a through 32l correspond to the "command registers" described therein. The command interpreting circuit 13 located downstream from the command filter 12 corresponds to the "processor that receives at least either of the commands and the associated data and executes prescribed processing." This is another combination of the elements corresponding to each element described in the claims herein.

Through the above construction, command data is correctly converted through rewriting of the contents of each register even where the command codes sent from the host computer have changed.

The command rewriting device 51 normally need not be connected to the command data conversion circuit 5, and may be connected only when commands are to be rewritten. Furthermore, instead of using a dedicated command rewriting device, the command in each register may be rewritten using the printer driver in the host computer or the CPU in the printer.

F. Variation 1

Figure 14:
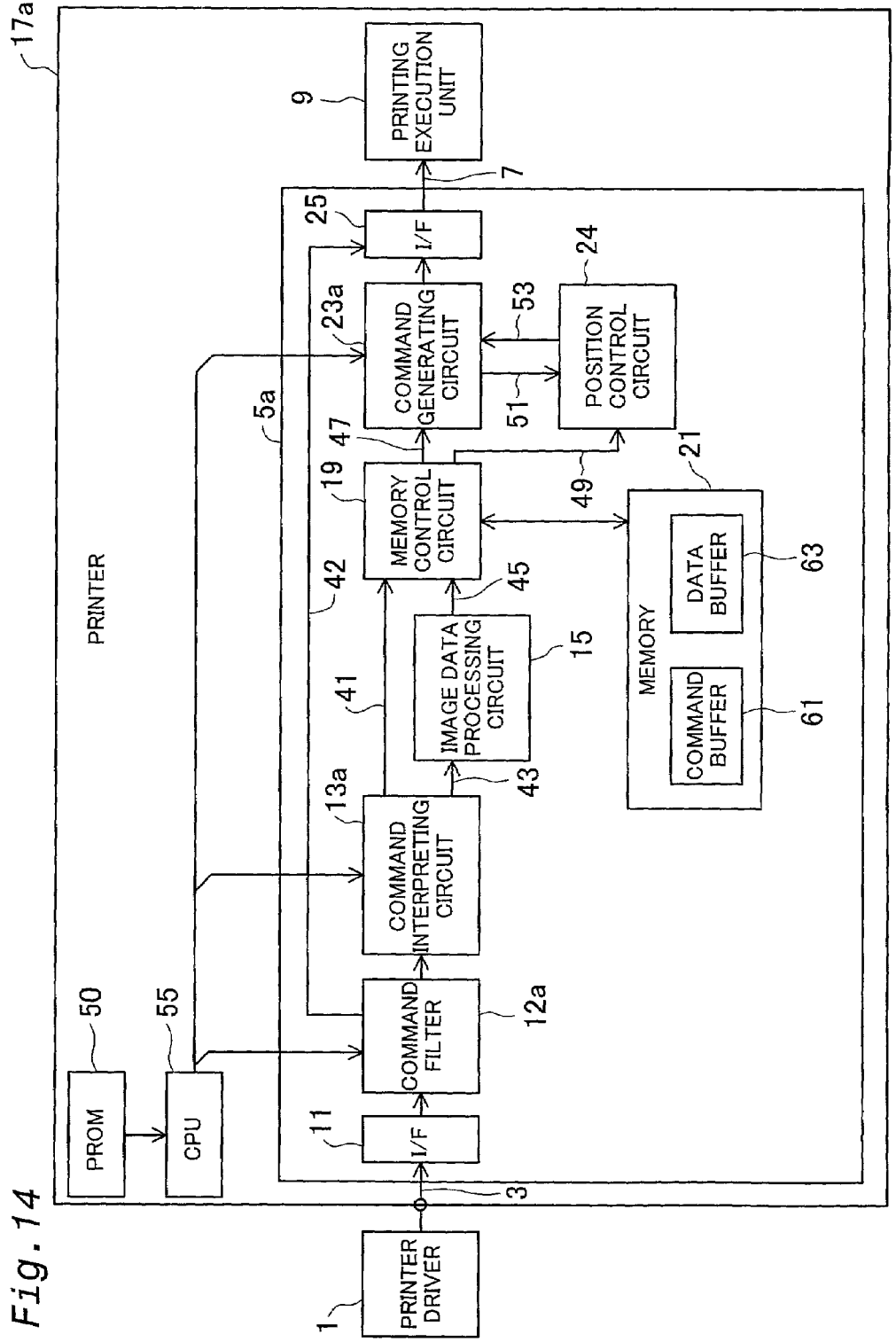
FIG. 14 shows the overall construction of a variation of the present invention.

FIG. 14 shows the overall construction of a variation of the present embodiment. This printer 17a includes a CPU 55 and a PROM 50. The commands and parameters are stored in the PROM 50 that are to be stored in the various registers of the command filter 12a, the command interpreting circuit 13a and the command generating circuit 23a of the command data conversion circuit 5a. The other aspects of this variation are identical to those of the printer 17 of the embodiment. The command data conversion circuit 5a is an ASIC (Application-Specific Integrated Circuit). In addition, the printer 17 of the embodiment has a CPU, though it is omitted from the drawing in FIG. 1.

Figure 15:
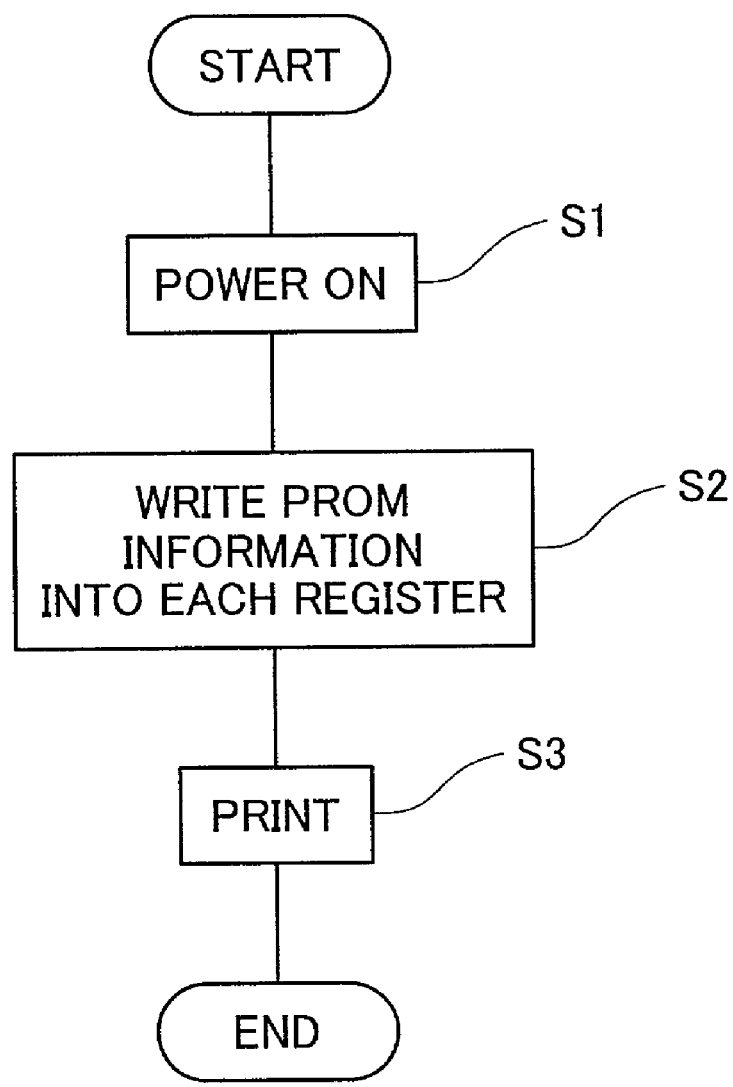
FIG. 15 is a flow chart showing the printing process in the printer used in the variation of the present invention.

FIG. 15 is a flow chart showing the printing process in the printer used in this variation. As shown in FIG. 15, when the power to the printer 17a is turned ON in step S1, in step S2 the CPU 55 writes the commands and color specification parameters stored in the PROM 50 into the prescribed addresses of the respective registers of the command filter 12a, the command interpreting circuit 13a and the command generating circuit 23a. In step S3, print circuit commands described below are received from the printer driver 1, the command data conversion circuit 5a interprets and performs prescribed processing regarding these commands, and printing is executed. The process by which the command interpreting and processing are carried out by the command data conversion circuit 5a in step S3 is the same as that described in connection with the embodiment.

The command data conversion circuit 5a in the Variation 1 corresponds to the "command data conversion device" described in the claims herein, and the CPU corresponds to the "external device" described therein.

In the Variation 1, the commands for prescribed processing are stored in a ROM, and when the power to the printer is turned ON, the commands in the ROM and the color specification parameters are written into the prescribed addresses of their respective registers in the command filter 12a, the command interpreting circuit 13a and the command generating circuit 23a. Consequently, the command data conversion circuit 5a manufactured as an ASIC need not have a unique design for each of the various types of printer, and may be produced based on common specifications for multiple types of printers. Therefore, the command data conversion circuit 5a may be manufactured in large quantities and at low cost.

The command data conversion circuit may be constructed based on specifications unique to each of the various types of printers, so that the commands that perform prescribed processing in the command filter 12a, the command interpreting circuit 13a and the command generating circuit 23a may be stored in a fixed manner. Using this construction as well, necessary processing can be carried out only with regard to those commands and data contained in the print command data that require processing in the same manner as such processing is carried out by the command data conversion circuit in the embodiment or the Variation 1.

Various commands may be written into the PROM 50 at the time of manufacture. As a result, even where a common ASIC is used in the printer manufacturing as the command data conversion circuit for various different types of printers, the printers can perform processing of different commands and data may be manufactured by changing the commands written into the PROM 50 depending on the type of printer.

G. Variation 2

Figure 16:
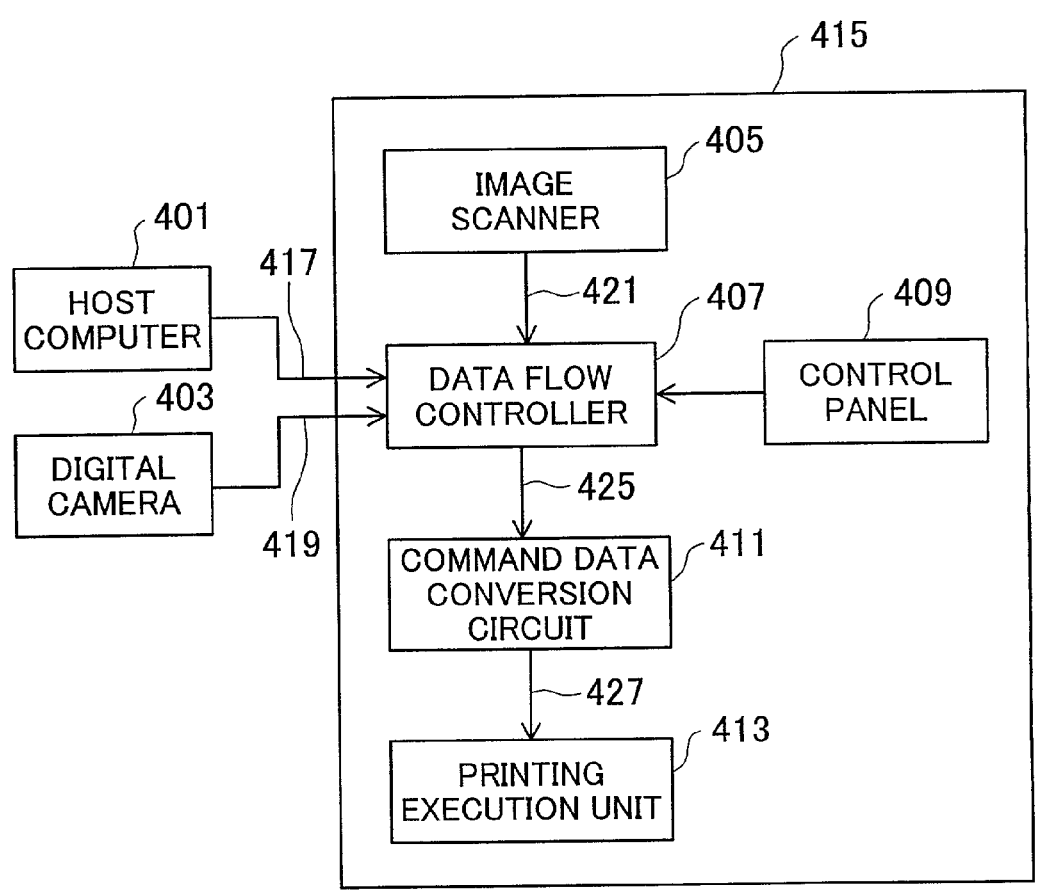
FIG. 16 shows the system construction in another embodiment of the present invention.

FIG. 16 shows the system construction of a different embodiment of the present invention. In this embodiment, a data flow controller 407 is located upstream of the command data conversion circuit (control circuit) 411. The data flow controller 407 may be connected to the following three types of host device: a host computer 401, a digital camera 403, and an image scanner 405. In this embodiment, the image scanner 405, the data flow controller 407, the command data conversion circuit 411 and the printing execution unit 413 are combined in one housing to form a single printer 415. The data flow controller 407 is also connected to the control panel 409 of the printer 415. The digital camera 403 is connected to the printer 415 only when necessary.

When printing is executed using the host computer 401, a series of control circuit commands as described above is generated by the printer driver in the host computer 401, and these control circuit commands are sent to the data flow controller 407 as shown by the arrow 417. The data flow controller 407 forwards these control circuit commands as is to the command data conversion circuit 411 as shown by the arrow 425. The command data conversion circuit 411 generates printer commands from these control circuit commands as described above, and sends them to the printing execution unit 413 as indicated by the arrow 427.

At the same time, the image scanner 405 and the digital camera 403 in principle simply output full-color RGB data, and do not have a function to generate control circuit commands. When the data flow controller 407 receives an instruction from the control panel 409 to perform printing using the image scanner 405 or the digital camera 403, it reads in full-color RGB raster image data from either the image scanner 405 or the digital camera 403, as indicated by the arrow 421 or 419. The data flow controller 407 then generates a series of control circuit commands for printing the RGB raster images based on the printing conditions specified by the user from the control panel. The data flow controller 407 then sends these commands to the command data conversion circuit 411 as indicated by the arrow 425. The command data conversion circuit 411 generates the printer commands described above from these control circuit commands and sends them to the printing execution unit 413 as indicated by the arrow 427.

In this way, printing may be executed using either the host computer 401, the digital camera 403 or the image scanner 405.

While several embodiments of the present invention are described above, the present invention is not limited to these embodiments, and may be realized using other types of embodiments without departing from the essential scope of the invention. For example, in the above embodiments, the control circuit carried out data operations involving processing to perform color conversion and halftone processing of natural-image image data, as well as interlace printing and overlap printing. But this is not the only form of implementation, and a certain increase in printing speed may be attained so long as the control circuit performs on behalf of the printer driver or printer some data operations during the process from generation of original image data by the host to the creation of final image data by the printer that may be used for printing. For example, the control circuit may perform only halftone processing of natural images, or may perform rasterizing, color conversion and halftone processing of the entire image including natural images as well as characters and/or drawings.

If data such as commands and parameters necessary to carry out these data operations is rewritably stored, changes in the commands and parameters may be easily accommodated by rewriting the data. For example, where the command data conversion circuit 5 is constructed as a circuit independent from the printer 17 as indicated by the blocks 33 and 35 in FIG. 2, various types of printers may be accommodated by rewriting the data necessary for data operations in accordance with the type of printer to which the circuit is connected. Similarly, where the command data conversion circuit 5 is constructed as a circuit independent from the host computer 31 as indicated by the blocks 35 and 37 in FIG. 2, various types of computer command data may be handled by rewriting the data necessary for data operations in accordance with the type of computer to which the circuit is connected. In addition, if the number of commands that may be stored in the memory units such as registers is set to be a number larger than the number of commands actually required, future increases in the number of commands may be handled.

In the above embodiment, the four ink colors of magenta, cyan, yellow and black are used in the printing apparatus, but light cyan and light magenta may be included as well. In such a case, the six colors of magenta, cyan, yellow, black, light cyan and light magenta constitute a second color system. Furthermore, light black (gray) ink may be used as well. In such a case, the second color system comprises seven colors, including light black. In other words, the printing apparatus is not limited in regard to the ink colors that it may use.

The various control processes described in connection with the above embodiments may also be realized in whole or in part through hardware circuitry.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A command data conversion device for use in a printing system, comprising:
    a processor that receives multiple image data sets corresponding to multiple inks used in the printing system and performs prescribed processing;
    a counter that counts a number of the image data sets received by the processor; and
    ink color data registers that store multiple ink color data indexes indicating which of multiple inks is to be used, and into which the multiple ink color data indexes may be written at least when the command data conversion device is manufactured, and wherein
    the processor generates data by adding to each of the image data sets a corresponding one of the ink color data indexes stored in the registers in accordance with a value of the counter when each of the image data sets is received.

2. The command data conversion device according to claim 1, wherein the ink color data registers are rewritable memories.

3. A printing apparatus used in a printing system, the printing apparatus comprising:
- a processor that receives multiple image data sets corresponding to the multiple inks used in the printing apparatus and performs prescribed processing;
- a counter that counts a number of the image data sets received by the processor; and
- ink color data registers that store multiple ink color data indexes indicating which of multiple inks is to be used, and wherein
- the processor generates data by adding to each of the image data sets a corresponding one of the ink color data indexes stored in the registers in accordance with a value of the counter when each of the image data sets is received.

* * * * *